United States Patent
Wyman et al.

(10) Patent No.: US 7,163,170 B1
(45) Date of Patent: Jan. 16, 2007

(54) METHOD FOR SENSING CARTRIDGE DECOUPLING IN TAPE DRIVE

(75) Inventors: Robert Olin Wyman, Longmont, CO (US); William Joseph Vanderheyden, Loveland, CO (US); John Douglas Willems, Jr., Arvada, CO (US)

(73) Assignee: Storage Technology Corporation, Louisville, CO (US)

( * ) Notice: Subject to any disclaimer, the term of this patent is extended or adjusted under 35 U.S.C. 154(b) by 345 days.

(21) Appl. No.: 10/897,620

(22) Filed: Jul. 23, 2004

(51) Int. Cl.
*G11B 23/04* (2006.01)
(52) U.S. Cl. ..................... 242/339; 360/96.5
(58) Field of Classification Search ................ 242/339, 242/340, 342, 349, 332.4; 360/85, 95, 96.1, 360/96.3, 96.4, 96.5
See application file for complete search history.

(56) References Cited

U.S. PATENT DOCUMENTS

| 4,625,248 A | * | 11/1986 | Manning et al. | 360/96.5 |
| 4,800,450 A | * | 1/1989 | Rodal et al. | 360/95 |
| 2005/0051653 A1 | * | 3/2005 | Rathweg | 242/332.4 |
| 2005/0231847 A1 | * | 10/2005 | Rathweg et al. | 360/96.5 |

* cited by examiner

*Primary Examiner*—William A. Rivera
(74) *Attorney, Agent, or Firm*—Brooks Kushman P.C.

(57) ABSTRACT

An apparatus and method for controlling the movement of an elevator mechanism in a tape drive system. The mechanism of the present invention employs a tachometer to detect the magnetic decoupling of a cartridge from a cartridge reel motor. A holding torque is placed on the cartridge reel motor. A voltage or current ramp is supplied to the elevator mechanism, wherein the elevator mechanism raises and magnetically decouples the tape cartridge from the cartridge reel motor. As the coupling force is broken, the torque placed on the cartridge reel motor causes the motor to turn. The tachometer detects the magnetic decoupling of the cartridge from the cartridge reel motor by sensing the angular displacement of the motor. In response, the controller decreases the voltage or current ramp to adapt to the load reduction on the elevator mechanism, and thereby more smoothly continue the elevator motion.

17 Claims, 7 Drawing Sheets

METHOD FOR SENSING CARTRIDGE DECOUPLING IN TAPE DRIVE

BACKGROUND OF THE INVENTION

1. Field of the Invention

The present invention relates generally to a magnetic storage media system, and particularly to a method and apparatus for detecting the magnetic decoupling of a storage medium from a media system drive motor.

2. Background of the Invention

Magnetic tape is a widely used data storage media. Tape drives and their corresponding tape media are applied to data storage tasks in all levels of computer data storage from personal computers to workstations to mainframes and supercomputers. Much of magnetic tape's popularity is due to the fact that it offers the lowest cost per unit of storage and highest volumetric storage efficiency of all available technologies. Tape products are available in many formats from many vendors in a wide range of cost categories ranging from less than one hundred to many ten's of thousands of dollars.

A magnetic tape drive system may include an elevator mechanism to load and unload the storage media within the tape drive system. For example, a tape drive cartridge elevator may be used to automatically retrieve a cartridge from a tape drive to transfer the cartridge to a slot in a tape cartridge magazine, and vice versa. The tape cartridge elevator may be positioned within the tape storage unit in a manner such that by raising the tape cartridge elevator, the elevator is allowed to unload cartridges from the cartridge reel motor within the storage unit.

A magnetic coupling system is typically used to hold the storage medium onto a cartridge reel motor. In order for the elevator to be able to unload the storage medium, the force of the magnet must be overcome. A known technique used to displace the storage medium from the coupler magnet involves "peeling" or obliquely elevating the storage medium from the magnet using the force of the raising elevator.

A problem encountered in conventional magnetic storage media systems is that large variations may be introduced in the momentum and resultant stopping distances of the elevator mechanism due to unpredictable torque load/friction variations. For example, a ramped voltage force or current is supplied to the elevator in order to raise the elevator from a lowered position together with the storage medium. Once the storage medium is decoupled from the cartridge reel motor, the elevator may experience a large drop in load when the elevator peels the storage medium from the coupler magnet. In an open-loop system (i.e., no feedback), the elevator controller is "blind" to the motion and position of the elevator until the elevator is detected by the elevator up sensor. Thus, the elevator controller may only adapt the voltage or current supplied to the elevator after the elevator up sensor detects the elevator position. However, at this point, it may be too late to control the elevator motion sufficiently enough to provide for smooth operation and predictable stopping distances. As a result, the timing of this load shift in the midst of the open-loop controlled elevator motion is unpredictable, and the elevator motion may become jerky and uneven. Short stopping distances may fail to raise the elevator far enough to hold its upper position, which must then be recovered by a secondary operation. On the other hand, long distances may cause the elevator to slam into its upper hard-stop, requiring the elevator to be stronger and more costly in order to meet the reliability requirements of the storage system.

Thus, it would be advantageous to have an apparatus and method to reduce the large variations in elevator momentum and resultant stopping distances and provide smoother control of the elevator mechanism in a magnetic tape drive system.

SUMMARY OF THE INVENTION

The present invention provides an apparatus and method for controlling the movement of an elevator mechanism in a tape drive system. The mechanism of the present invention employs a tachometer to detect the magnetic decoupling of a cartridge from a cartridge reel motor. A holding torque is placed on the cartridge reel motor. A voltage or current ramp is supplied to the elevator mechanism, wherein the elevator mechanism raises and magnetically decouples the tape cartridge from the cartridge reel motor. As the coupling force is broken, the torque placed on the cartridge reel motor causes the motor to turn. The tachometer detects the magnetic decoupling of the cartridge from the cartridge reel motor by sensing the angular displacement of the motor. In response, the controller decreases the voltage or current ramp to adapt to the load reduction on the elevator mechanism, and thereby more smoothly continue the elevator motion.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
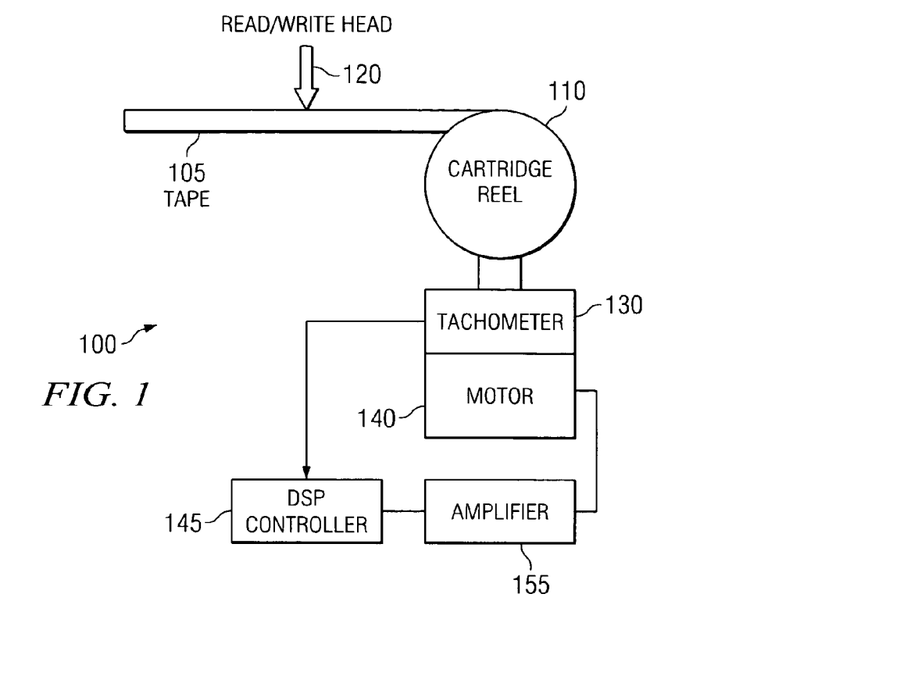
FIG. 1 is a block diagram of the components of a tape drive system in accordance with a preferred embodiment of the present invention.

With reference now to the figures, and in particular with reference to FIG. 1, a block diagram of the components of a tape drive system in accordance with a preferred embodiment of the present invention is shown. Tape drive system 100 is an example of a tape drive system that can record data from a host computer onto magnetic tape. While a tape drive system is depicted in FIG. 1, the depiction of a tape drive system is only intended to be illustrative. It should be appreciated that the present invention is not limited to use with magnetic tape and any magnetic media system may make use of the aspects of the present invention without departing from the spirit and scope of the present invention.

Tape drive system 100 is an example of a tape system in which the present invention may be implemented. The tape drive system contains magnetic tape 105, which is connected to cartridge reel 110. Read/write head 120 stores and retrieves data from the tape. Tachometer 130 and motor 140 are attached to cartridge reel 110 by motor shafts (not shown). Tachometer 130 sends data signals to digital signal processor (DSP) controller 145, which routes the signals through amplifier 155.

In the depicted examples, tachometer 130 is implemented using encoders, such as an optical encoder. An encoder senses and indicates rotation of the motor shaft. To position cartridge reel 110, DSP controller 145 determines the actual position based on position encoder signals received from the encoders and moves the motor to position the reel to the desired position. The amplifiers change the level of the signal generated by DSP controller 145 for use by motor 140.

Figure 2A:
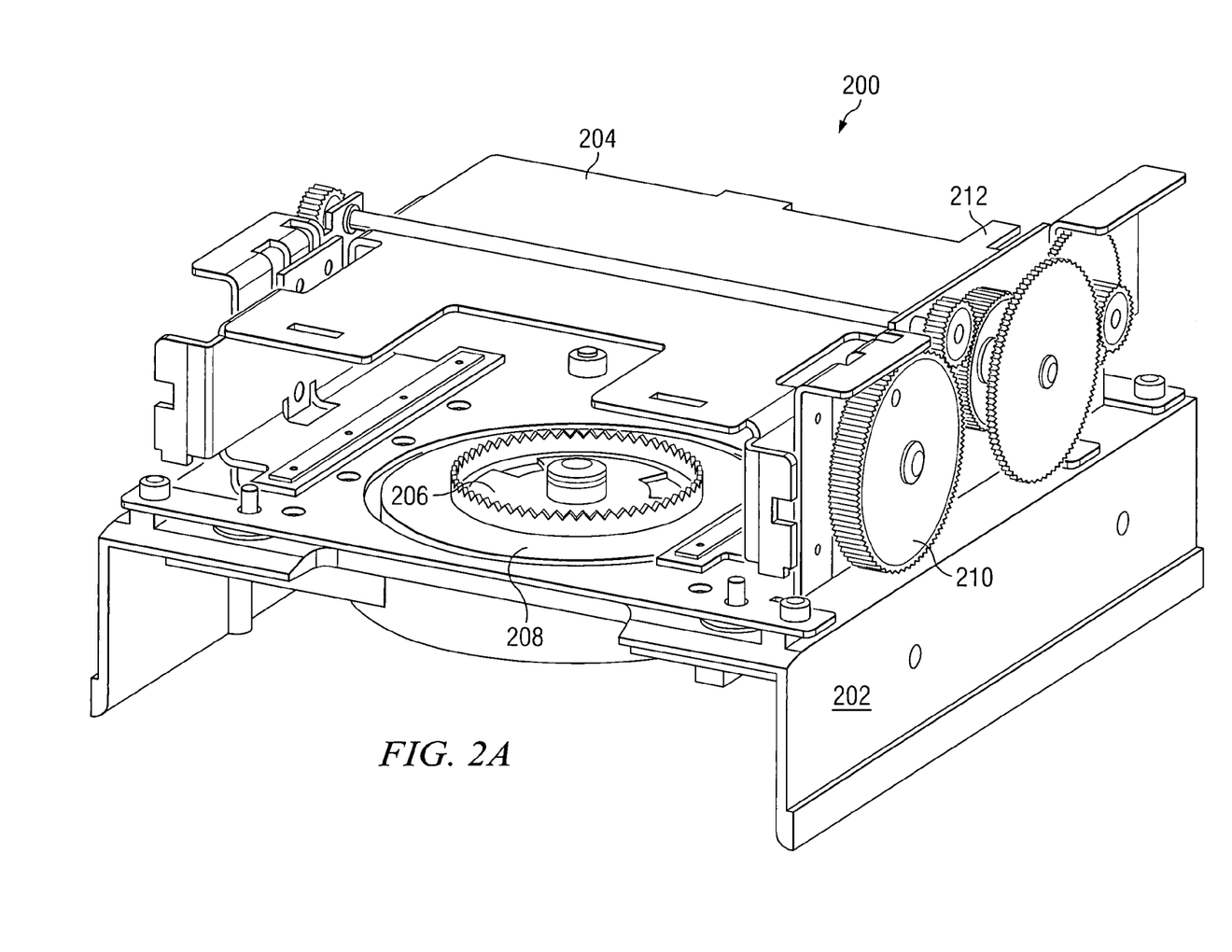
FIGS. 2A and 2B are pictorial representations of a tape drive system elevator mechanism and a tape cartridge in accordance with a preferred embodiment of the present invention.
Figure 2B:
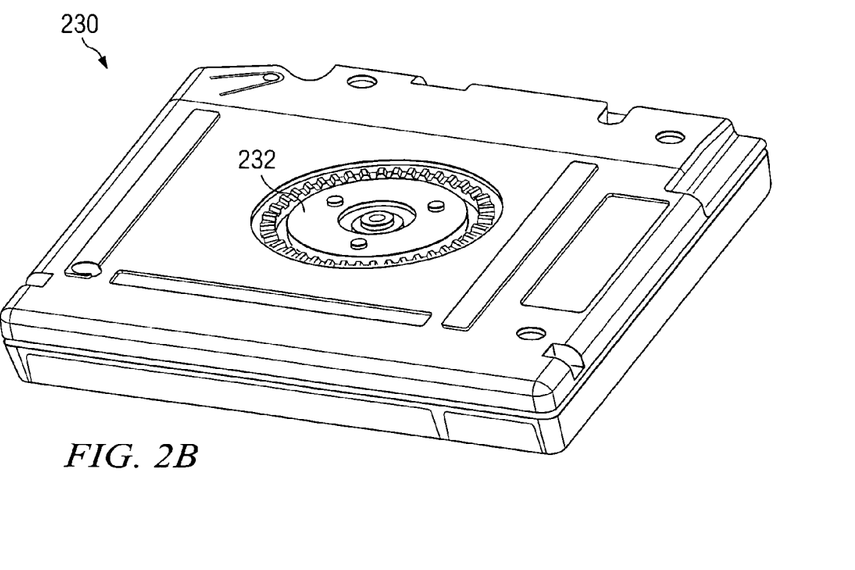

FIGS. 2A and 2B are pictorial representations of a tape drive system elevator mechanism and tape cartridge in accordance with a preferred embodiment of the present invention is shown. In particular, FIG. 2A depicts an elevator mechanism 200 for guiding and securing a tape cartridge, such as tape cartridge 230 in FIG. 2B, into proximity with a cartridge reel motor in accordance with a preferred embodiment of the present invention. FIG. 2B provides a bottom view of a tape cartridge that may be placed in elevator mechanism 200.

Elevator mechanism 200 comprises base assembly 202 and shuttle 204 for receiving tape cartridge 230. Base assembly 202 includes reel coupling magnet 206, cartridge reel motor 208, and cartridge reel motor tachometer (not shown). Reel coupling magnet 206 is used to hold tape cartridge 230 in place as cartridge reel motor 208 winds the tape within the cartridge. Metal washer 232 located on the bottom of tape cartridge 230 allows for the magnetic coupling of tape cartridge 230 and reel coupling magnet 206. Shuttle 204 carries tape cartridge 230 when loading and unloading in elevator mechanism 200. Shuttle 204 has guide pins (not shown) extending from a lateral side of the shuttle for engaging and riding on intrusions within cam 210.

When a command is given to unload tape cartridge 230, a supply voltage is sent to the elevator motor (not shown). The elevator motor actuates the gear train (not shown). The gear train turns cam 210, causing the guide pins extending from shuttle 204 to be raised. As shuttle 204 is raised, tape cartridge 230 is lifted off of cartridge reel motor 208. Subsequently, the magnetic coupling force connecting reel coupling magnet 206 to metal washer 232 in tape cartridge 230 is broken. An elevator up sensor (not shown) is used to detect when elevator mechanism 200 reaches a certain position by sensing shuttle tab 212. Once the elevator up sensor detects the position of shuttle tab 212, elevator mechanism 200 is brought to a stop.

Figure 3A:
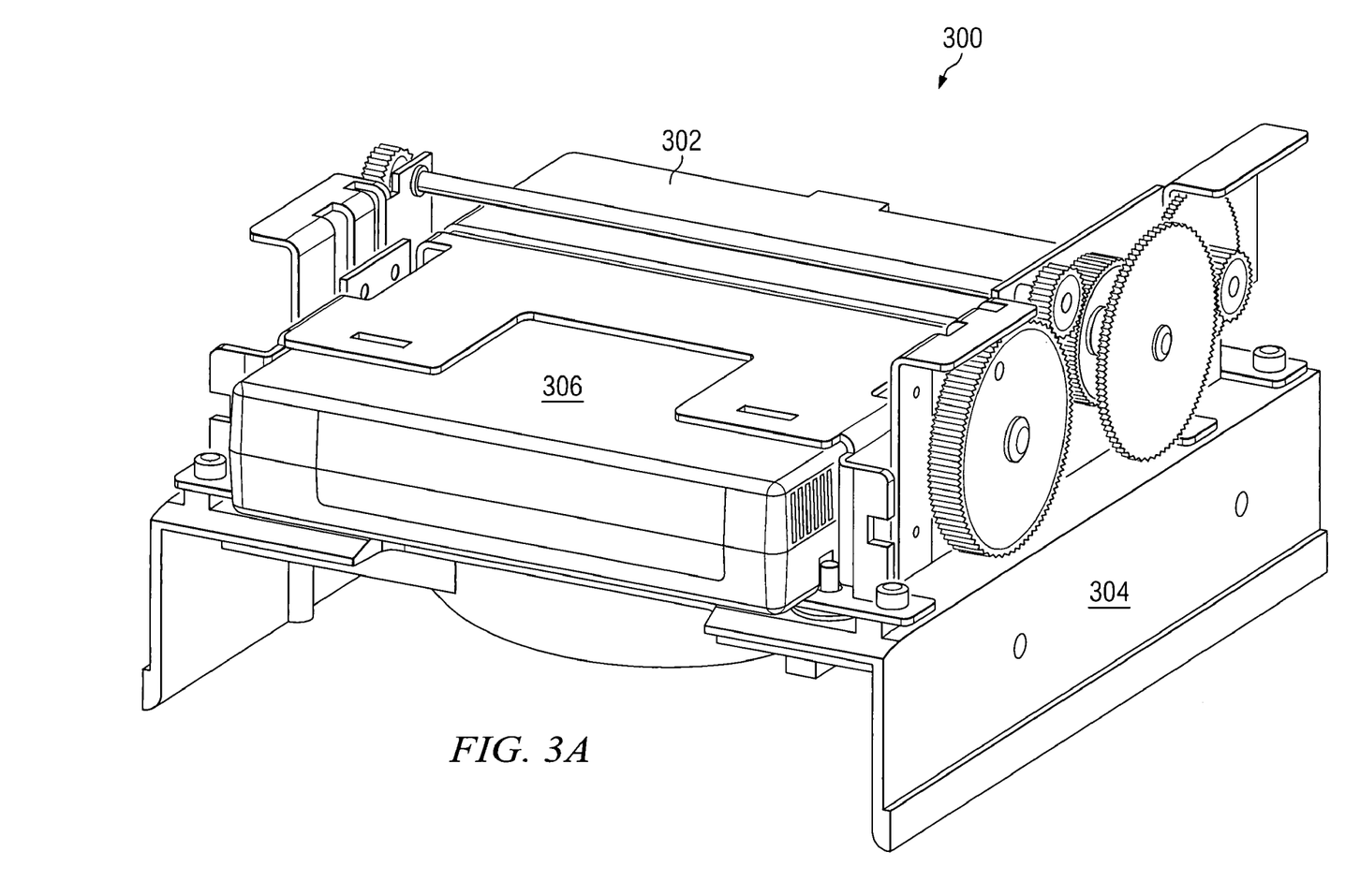
FIGS. 3A and 3B are pictorial representations of an elevator mechanism in a tape drive system in "elevator down" and "elevator up" positions in accordance with a preferred embodiment of the present invention.
Figure 3B:
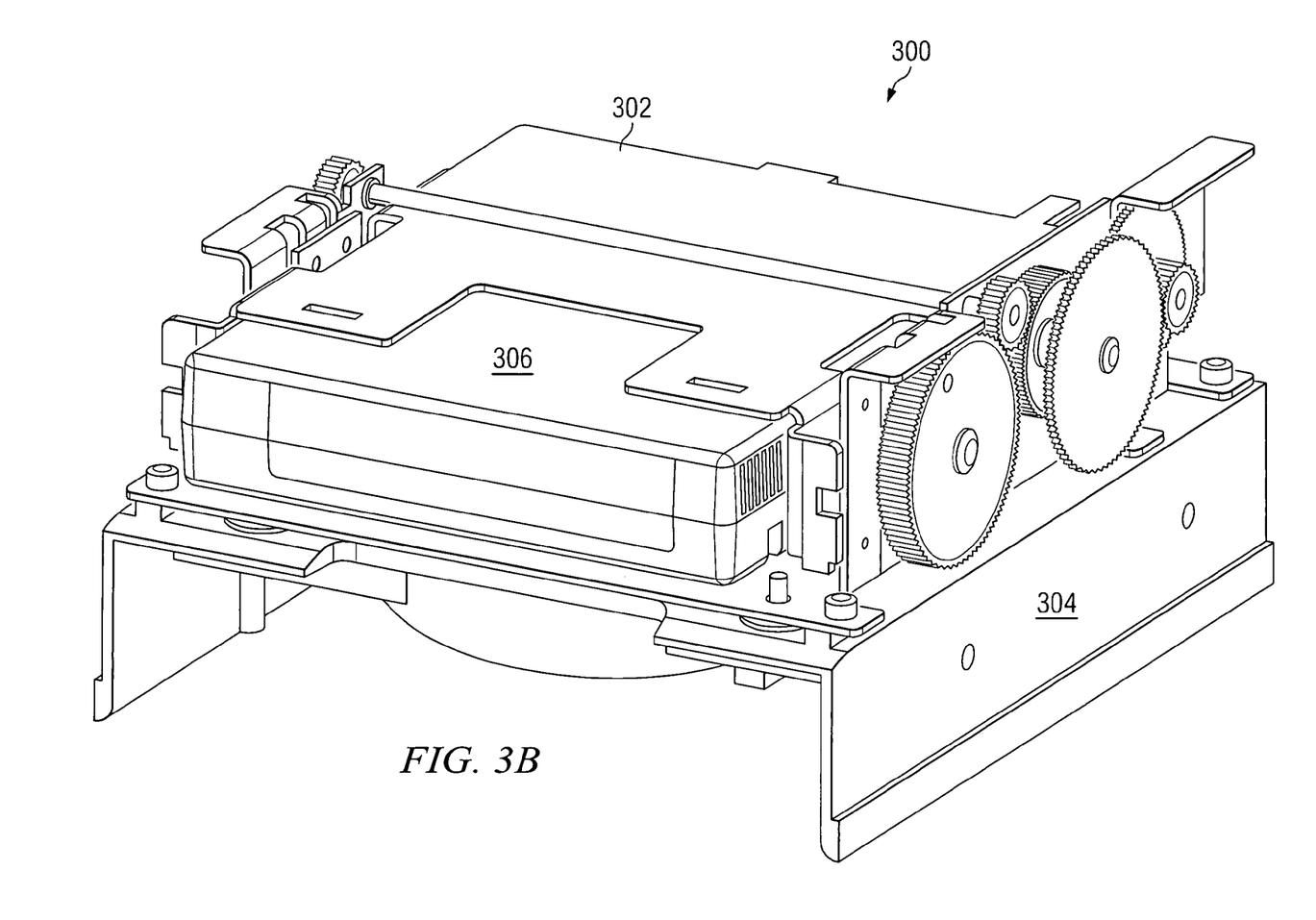

FIGS. 3A and 3B are pictorial representations of an elevator mechanism in a tape drive system in "elevator down" and "elevator up" positions in accordance with a preferred embodiment of the present invention. In particular, FIG. 3A illustrates elevator mechanism 300 in an "elevator down" position. Shuttle 302 is shown as resting upon base assembly 304. In this "elevator down" position, tape cartridge 306 is magnetically coupled to the reel coupling magnet. In contrast, FIG. 3B illustrates elevator mechanism 300 in an "elevator up" position. In this "elevator up" position, tape cartridge 306 has been lifted off of the cartridge reel motor and magnetically decoupled from the reel coupling magnet. Although FIGS. 3A and 3B illustrate elevator movement in an up and down direction, it must be noted that the present invention may apply to any orientation of elevator movement, including left/right or sideways movement.

Figure 4A:
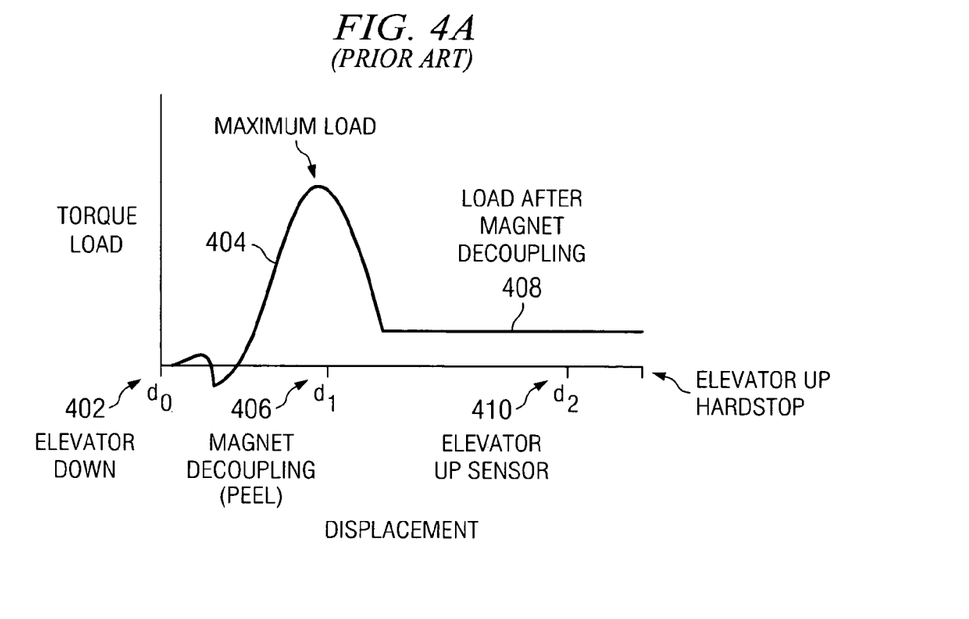
FIG. 4A is a graph illustrating a torque load profile of the tape cartridge elevator motor in a known tape storage system.
Figure 4B:
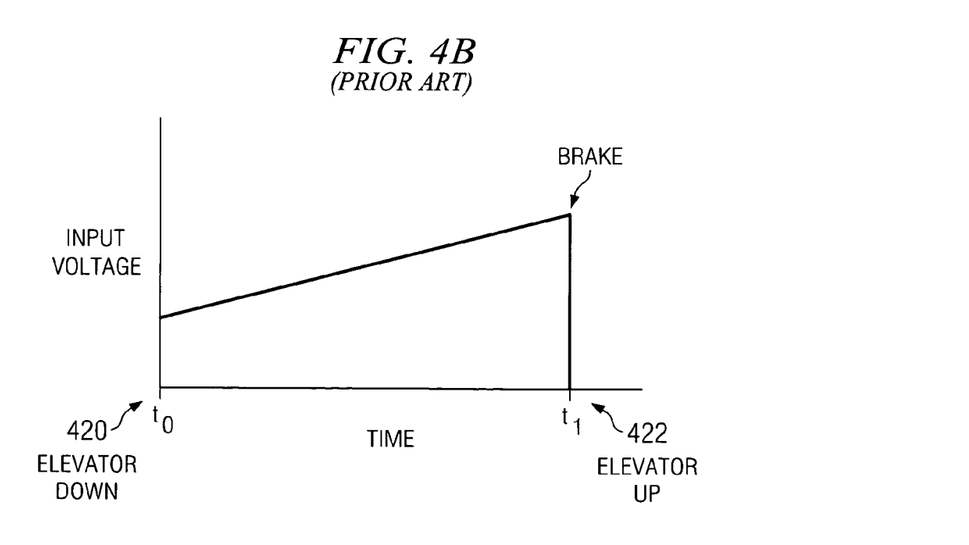
FIG. 4B is a graph illustrating a voltage profile of the tape cartridge elevator motor in the known tape storage system.

Turning now to FIGS. 4A and 4B, graphs illustrating the effects of a tape cartridge unload operation in a conventional tape storage system are shown. In particular, FIG. 4A depicts a representative torque profile of tape cartridge elevator mechanism 200 in FIG. 2A in known tape storage system 100 shown in FIG. 1. This graph shows the torque required of the tape cartridge elevator mechanism (Y-axis) as a function of displacement of the vertical position of the shuttle (X-axis). The elevator mechanism is in an elevator down position at displacement $d_0$ shown at 402. The elevator mechanism is set in motion at the request of the controller, such as controller 145 in FIG. 1, to unload the tape cartridge from the cartridge reel motor. The elevator mechanism is raised during an unload operation after the tape media and its leader are completely spooled back into the cartridge.

As the tape cartridge elevator mechanism begins the unload operation, the torque load required to peel the magnetically coupled tape cartridge from the cartridge reel motor in the tape drive increases, as shown at 404. The torque load increases as the elevator mechanism attempts to decouple the tape cartridge from the cartridge reel motor. At displacement $d_1$ shown at 406, the elevator mechanism reaches a maximum torque load needed to peel the tape cartridge from the cartridge reel motor. The torque load on the tape cartridge elevator mechanism then drops to a substantially constant value as shown at 408. The maximum torque load required to peel the tape cartridge from the cartridge reel motor can be about four times this subsequent substantially constant or steady state torque load at 408.

At displacement $d_2$ shown at 410, the elevator motion may be detected by an elevator up sensor. In an open-loop system, this elevator up sensor provides feedback regarding the motion and position of the elevator, such that brakes may be applied to the elevator mechanism in order to stop the elevator motion. Since the elevator controller is "blind" to the motion and position of the elevator until the elevator is detected by the elevator up sensor, the elevator controller may adapt the voltage or current supplied to the elevator after the elevator up sensor detects the elevator. However, at this point, it may be too late to control the elevator motion sufficiently enough to provide for smooth operation. Consequently, large variations may be introduced into the momentum and resultant stopping distances of the elevator mechanism. Short stopping distances fail to raise the elevator far enough to hold its upper position, which must then be recovered by a secondary operation. On the other hand, long distances cause the elevator to slam into its upper hard-stop, requiring the elevator to be stronger and more costly in order to meet the reliability requirements of the storage system.

Turning now to FIG. 4B, a profile of the voltage ramp required by the tape cartridge elevator mechanism in the known tape storage system is depicted. Although a voltage ramp is used in this illustrative example, any method of raising the tape cartridge elevator, such as supplying a step voltage (applying a fixed voltage for a period of time and then increasing the voltage in a step-like fashion) may be used. This graph shows the input voltage used to raise the tape cartridge elevator mechanism (Y-axis) as a function of time (X-axis). The elevator mechanism is in an elevator down position at time $t_0$ shown at 420. As the tape cartridge elevator motor begins the unload operation, the voltage supplied to the elevator motor is increased steadily. Since the elevator controller is blind to the elevator motion and position in this open-loop system, the elevator controller is unaware how much input voltage is needed to peel the tape cartridge from the cartridge reel motor. Consequently, the voltage supplied to the elevator mechanism is continuously ramped in an expectation of overcoming the magnetic coupling at some point prior to sensing the elevator up position. At time $t_1$ shown at 422, the elevator up sensor detects the elevator position. Brakes are subsequently applied to the elevator mechanism in order to stop the elevator motion.

The present invention provides a solution to the problem of having large variations in elevator momentum and resulting stopping distances by detecting the magnetic decoupling of the storage medium from the cartridge reel motor. The present invention addresses this problem by using the cartridge reel motor tachometer to detect and measure the magnetic decoupling of the storage medium from the cartridge reel motor in order to allow the elevator controller to adapt to the load reduction and more smoothly continue the elevator motion. Smoother control of the elevator mechanism also helps to quiet the drive operation, adding to the aesthetic quality of the drive for environments where manual cartridge loading is realized.

Figure 5A:
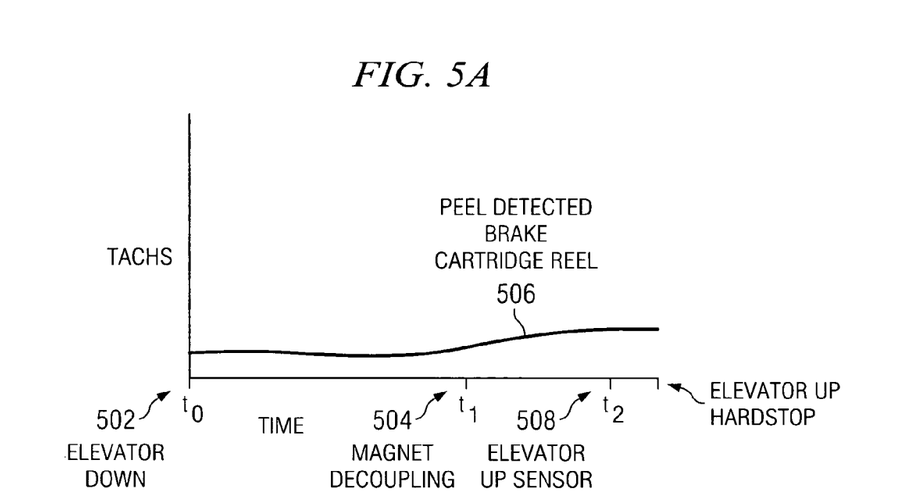
FIG. 5A is a graph illustrating a tachometer profile of a cartridge reel motor in operation in accordance with a preferred embodiment of the present invention.
Figure 5B:
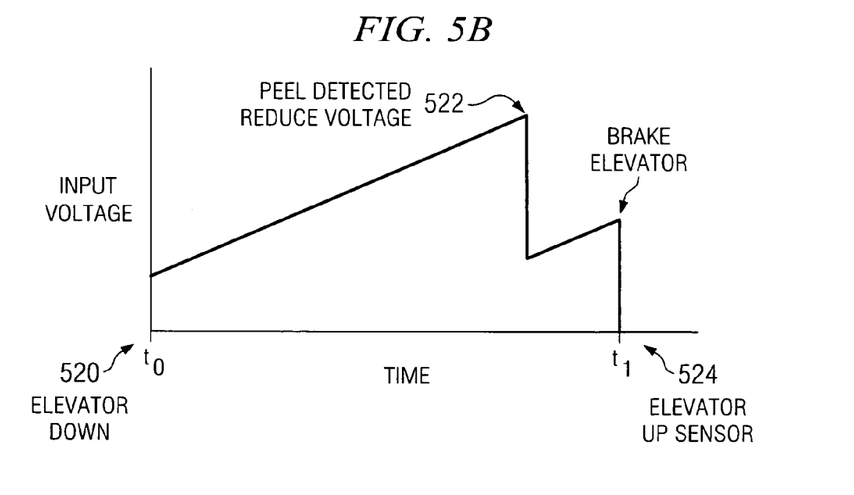
FIG. 5B is a graph illustrating an adaptive voltage profile of an elevator mechanism in operation in accordance with a preferred embodiment of the present invention.

FIGS. 5A and 5B are graphs illustrating the effects of a tape cartridge unload operation that employs a cartridge reel motor tachometer to sense the magnetic decoupling of a tape cartridge from the cartridge reel motor. The magnetic decoupling detection system of the present invention illustrated in this figure may be implemented within tape cartridge elevator mechanism 200 in FIG. 2A.

In particular, FIG. 5A is a tachometer profile of a cartridge reel motor in operation in accordance with a preferred embodiment of the present invention. This graph shows the cartridge reel tachometer count. Tach lines are counted as they are sensed during motor rotation of the tape cartridge reel motor (Y-axis) as a function of time (X-axis). The elevator mechanism is in an elevator down position at time to shown at 502. Prior to raising the elevator, a light holding torque is applied to the cartridge reel motor. The holding torque placed on the cartridge reel motor holds the cartridge leader against its stops in the cartridge. These "stops" are recessed pockets in the cartridge. The cartridge leader has "ears" on it such that its width is wider at the end to allow the cartridge leader to be held by its stops.

When the elevator mechanism is raised, the magnetically coupled tape cartridge is peeled from the cartridge reel motor, as shown at 504. At this point, the cartridge reel motor, no longer held stationary by the cartridge leader, begins to turn due to the holding torque. The cartridge reel tachometer detects and measures the angular displacement of the cartridge reel motor. By detecting the angular displacement of the cartridge reel motor, the tachometer may be used to detect the magnetic decoupling of the tape cartridge from the cartridge reel motor, shown at 506. Braking is then applied to the cartridge reel motor to prevent scraping the cartridge reel motor coupling teeth against the associated teeth in the cartridge. At time $t_2$ shown at 508, the elevator motion may be detected by an elevator up sensor.

FIG. 5B is a graph illustrating an adaptive voltage profile of an elevator mechanism in operation in accordance with a preferred embodiment of the present invention. This graph shows how the voltage used to raise the tape cartridge elevator mechanism may be adapted to the load reduction when the tape cartridge is peeled from the cartridge reel motor. The elevator mechanism is in an elevator down position at time to shown at 520. As the tape cartridge elevator motor begins the unload operation, the voltage supplied to the elevator motor is increased steadily. When the peel is detected, the elevator controller may adapt to the load reduction and reduce the voltage to the elevator mechanism, shown at 522. As mentioned previously, the peel may be detected when the tachometer senses the angular displacement of the cartridge reel motor caused by the holding torque placed on the cartridge reel motor. After the elevator controller reduces the voltage, the voltage supplied to the elevator is again increased steadily. At time $t_1$ shown at 524, the elevator up sensor detects the elevator position. Brakes are applied to the elevator mechanism in order to stop the elevator motion. By detecting magnetic decoupling of the tape cartridge from the cartridge reel motor, it is possible to have the elevator controller adjust the voltage in response to detecting the load reduction, thereby allowing for smoother elevator motion.

Figure 6:
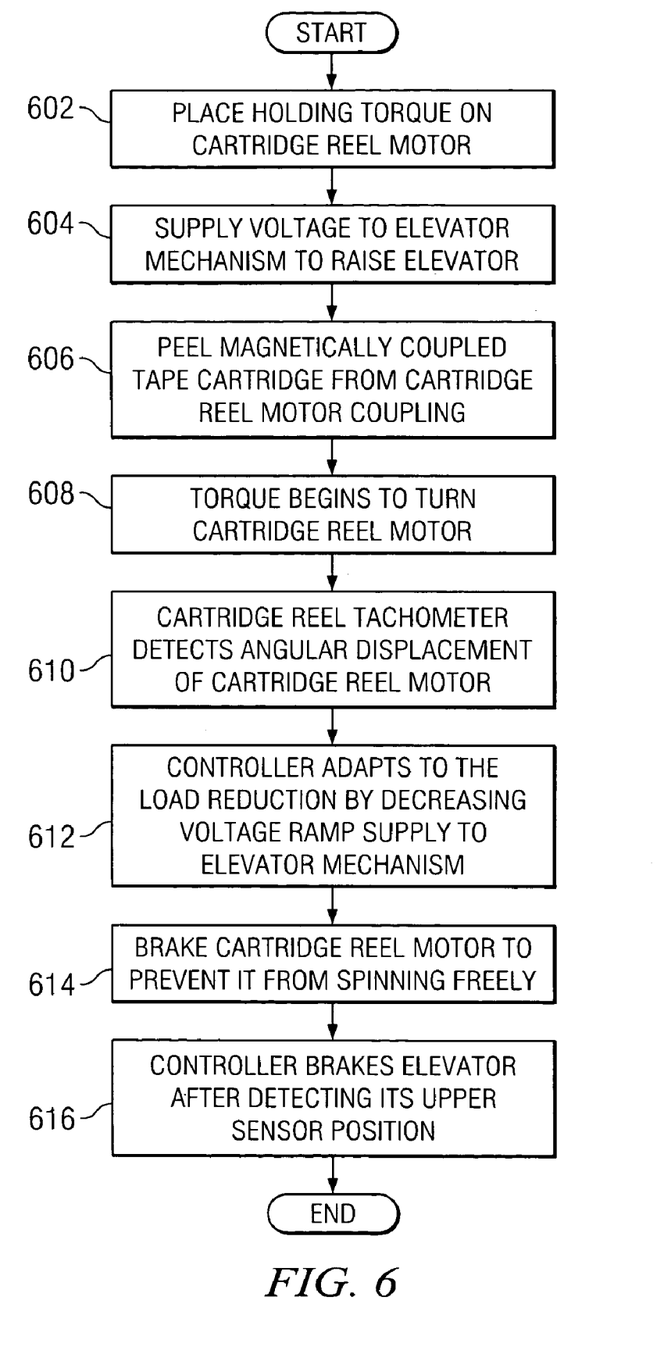
FIG. 6 is a flowchart of the process for smoothing the motion of the elevator mechanism by detecting the magnetic decoupling of the cartridge from the cartridge reel motor in accordance with a preferred embodiment of the present invention.

FIG. 6 is a flowchart of the process for smoothing the motion of the elevator mechanism by detecting the magnetic decoupling of the cartridge from the cartridge reel motor in accordance with a preferred embodiment of the present invention. The process in FIG. 6 may be implemented in the illustrative examples in a controller such as digital signal processor controller 145 in FIG. 1.

The process begins by placing a light holding torque on the cartridge reel motor (step 602). This step is performed prior to raising the elevator from its lowered position. The holding torque placed on the cartridge reel motor holds the cartridge leader against its stops in the cartridge. Next, the controller supplies a voltage or current to the elevator mechanism to raise the elevator (step 604). The initial voltage or current supplied to the elevator mechanism is ramped in a steady manner to allow the elevator to break its static friction. As the elevator is being raised, the increasing voltage force or current also allows the elevator mechanism to break the magnetic coupling force of the cartridge reel motor coupler (step 606). In this manner, the elevator may peel the magnetically coupled tape cartridge from the cartridge reel motor coupling in the drive. At this point, teeth on the cartridge spool begin to separate from matching teeth on the cartridge motor coupling.

As the coupling force is broken and the teeth separate, the torque applied to the cartridge reel will begin to turn the cartridge reel motor (step 608). The cartridge reel tachometer may detect and measure the angular displacement of the cartridge reel motor (step 610). In response, the open-loop elevator controller analyzes the tachometer measurements and may decrease the voltage or current ramp in order to adapt to the detected load reduction (step 612). As a result, the resultant elevator momentum and variation is reduced, and the elevator more smoothly and predictably may continue its motion. At the same time, the controller decelerates the cartridge reel motor to a stationary position to prevent the cartridge reel from spinning freely (step 614). When the elevator is detected as being in its upper sensor position, the elevator controller decelerates the elevator to a stationary position (step 616). Consequently, the resultant stop position is less variant. Thus, slamming into the hard-stop and secondary recovery operations are avoided.

Thus, the present invention provides an apparatus and method for sensing the magnetic decoupling of a tape cartridge from a cartridge reel motor. The mechanism of the present invention allows for sensing this transition without requiring additional components by extending the usage of the cartridge reel motor tachometer. Already required by the tape drive for controlling the reel motor system, the cartridge reel motor tachometer is used to detect the magnetic decoupling of the tape cartridge from the cartridge reel motor. The elevator controller may then use the tachometer measurements to adaptively reduce the voltage force or current supplied to the elevator in order to more smoothly and predictably control the upward motion of the elevator.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a tape drive system for detecting tape cartridge decoupling from a cartridge reel motor using a cartridge reel motor tachometer, comprising:

placing a torque on the cartridge reel motor, wherein a cartridge tape leader is held against stops in the tape cartridge;

supplying at least one of a voltage or current to an elevator mechanism, wherein the elevator mechanism raises and magnetically decouples the tape cartridge from the cartridge reel motor, and wherein the magnetic decoupling causes the cartridge reel motor to turn;

using the cartridge reel motor tachometer to detect and measure the angular displacement of the cartridge reel motor;

adapting the voltage or current supplied to the elevator mechanism in response to measuring a load reduction on the elevator mechanism.

2. The method of claim 1, further comprising:

detecting a point at which the elevator mechanism is raised to an elevator up position; and decelerating the elevator mechanism to a stationary position when the elevator up position is detected.

3. The method of claim 1, wherein adapting the voltage or current supplied to the elevator mechanism reduces variations in the elevator mechanism's stopping distances.

4. The method of claim 1, wherein adapting the voltage or current supplied to the elevator mechanism allows the elevator mechanism to hold its elevator up position.

5. The method of claim 1, wherein adapting the voltage or current supplied to the elevator mechanism prevents the elevator mechanism from slamming into its upper hard-stop.

6. The method of claim 1, wherein supplying the voltage or current to the elevator mechanism includes increasing the voltage or current to allow the magnetic decoupling of the tape cartridge from the cartridge reel motor.

7. The method of claim 1, wherein adapting the voltage or current supplied to the elevator mechanism includes reducing the voltage or current supplied to the elevator mechanism.

8. The method of claim 1, wherein a controller places the torque on the cartridge reel motor.

9. The method of claim 1, wherein the stops are recessed pockets in the tape cartridge.

10. A tape drive system for detecting tape cartridge decoupling from a cartridge reel motor using a cartridge reel motor tachometer, comprising:

placing means for placing a torque on the cartridge reel motor, wherein a cartridge tape leader is held against stops in the tape cartridge;

supplying means for supplying a voltage or current to an elevator mechanism, wherein the elevator mechanism raises and magnetically decouples the tape cartridge from the cartridge reel motor, and wherein the magnetic decoupling causes the cartridge reel motor to turn;

using means for using the cartridge reel motor tachometer to detect and measure the angular displacement of the cartridge reel motor;

adapting means for adapting the voltage or current supplied to the elevator mechanism in response to measuring a load reduction on the elevator mechanism.

11. The tape drive system of claim 10, further comprising:

detecting means for detecting a point at which the elevator mechanism is raised to an elevator up position; and decelerating means for decelerating the elevator mechanism to a stationary position when the elevator up position is detected.

12. The tape drive system of claim 10, wherein adapting the voltage or current supplied to the elevator mechanism reduces variations in the elevator mechanism's stopping distances.

13. The tape drive system of claim 10, wherein adapting the voltage or current supplied to the elevator mechanism allows the elevator mechanism to hold its elevator up position.

14. The tape drive system of claim 10, wherein adapting the voltage or current supplied to the elevator mechanism prevents the elevator mechanism from slamming into its upper hard-stop.

15. The tape drive system of claim 10, wherein supplying the voltage or current to the elevator mechanism includes increasing the voltage or current to allow the magnetic decoupling of the tape cartridge from the cartridge reel motor.

16. The tape drive system of claim 10, wherein adapting the voltage or current supplied to the elevator mechanism includes reducing the voltage or current supplied to the elevator mechanism.

17. A tape drive system for predictably controlling an elevator mechanism motion during an unload operation, comprising:

a cartridge reel motor, a tape cartridge magnetically coupled to the cartridge reel motor;

a controller, wherein the controller places a torque on the cartridge reel motor, and wherein the cartridge reel motor is held in place against stops in the tape cartridge;

an elevator mechanism for magnetically decoupling the tape cartridge from the cartridge reel motor, wherein at least one of a voltage or current is used to raise the elevator mechanism and magnetically decouple the tape cartridge from the cartridge reel motor, and wherein the magnetic decoupling causes the cartridge reel motor to turn; and a cartridge reel motor tachometer coupled to the cartridge reel motor, wherein the cartridge reel motor tachometer detects and measures angular displacement of the cartridge reel motor; and wherein the controller adapts the voltage or current used to raise the elevator mechanism in response to measuring a load reduction on the elevator mechanism.

* * * * *